T. ZABROCKI.
MAGAZINE CAMERA.
APPLICATION FILED OCT. 28, 1909.
990,941.
Patented May 2, 1911.
7 SHEETS—SHEET 2.
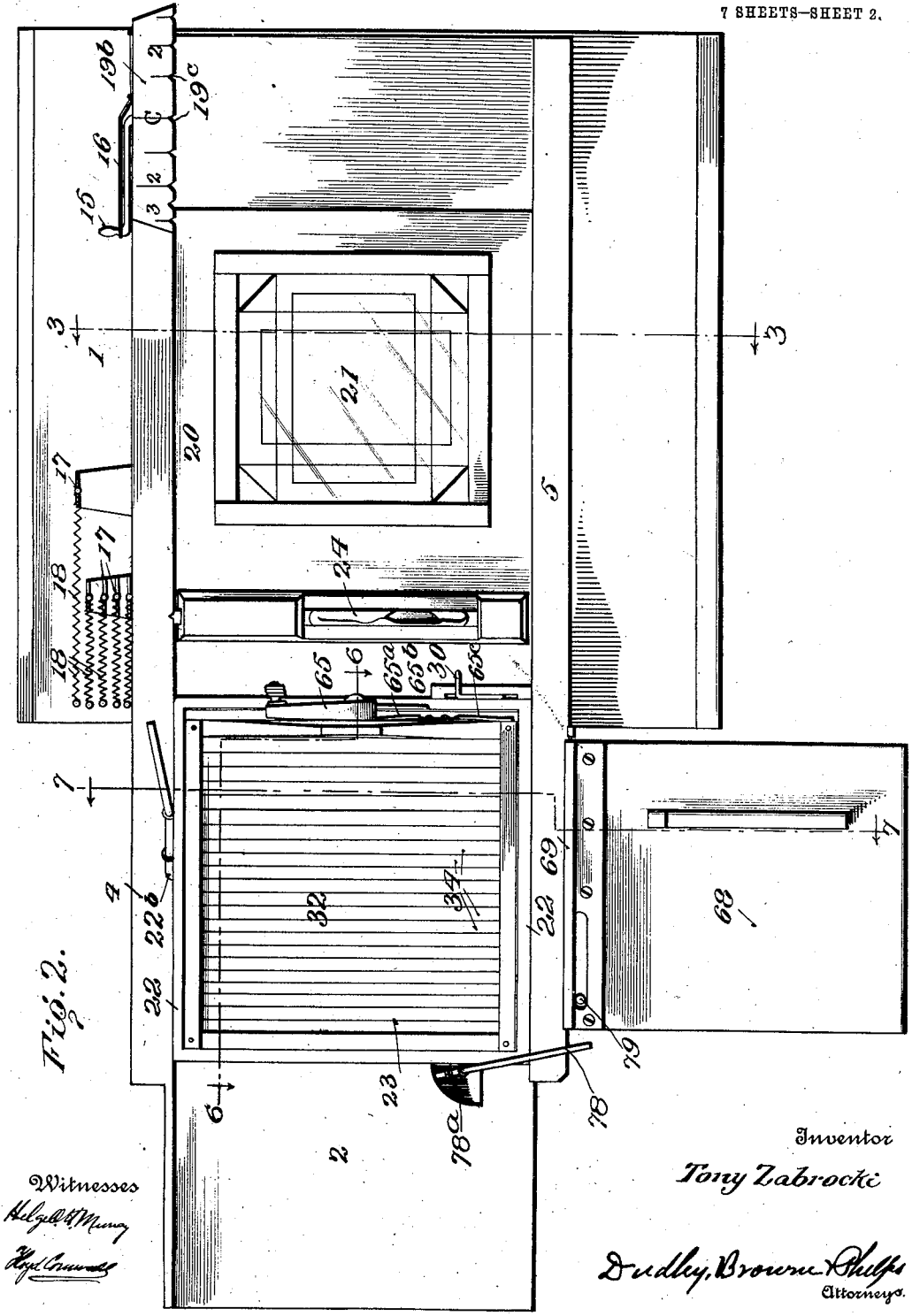
Witnesses
Inventor
Tony Zabrocki
Dudley, Browne & Phelps
Attorneys.

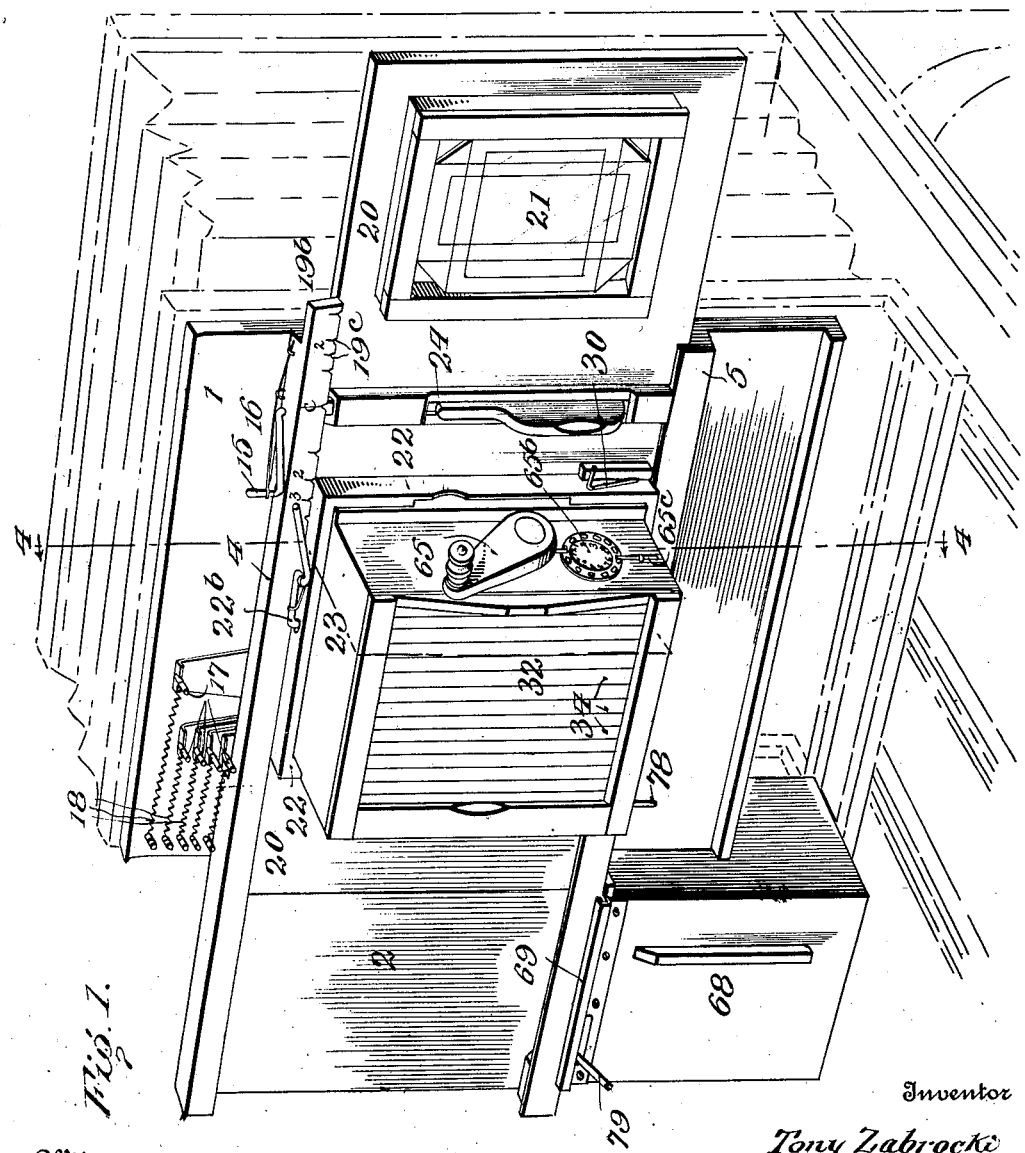

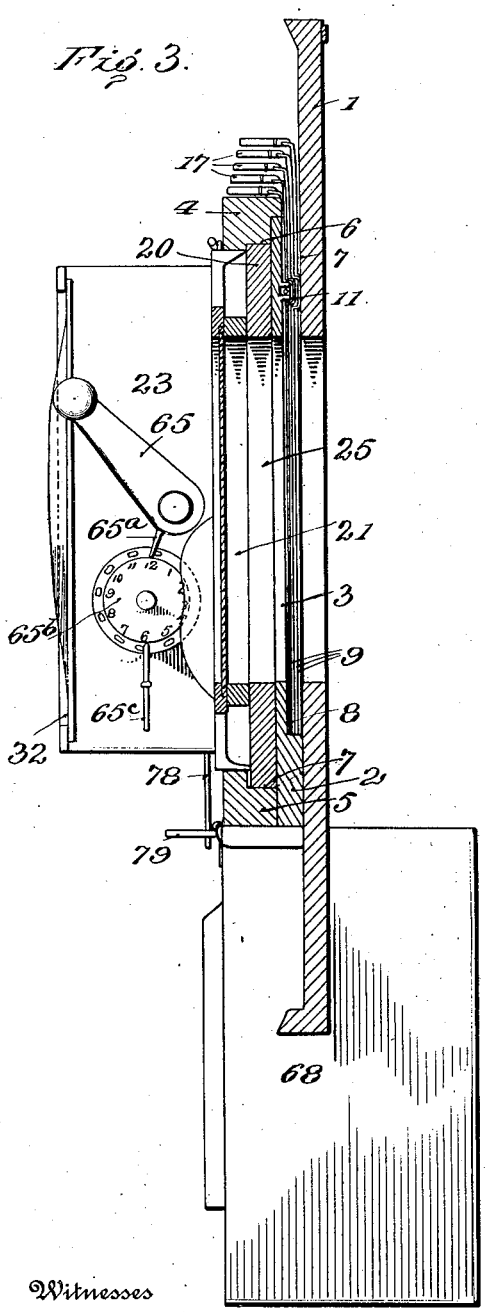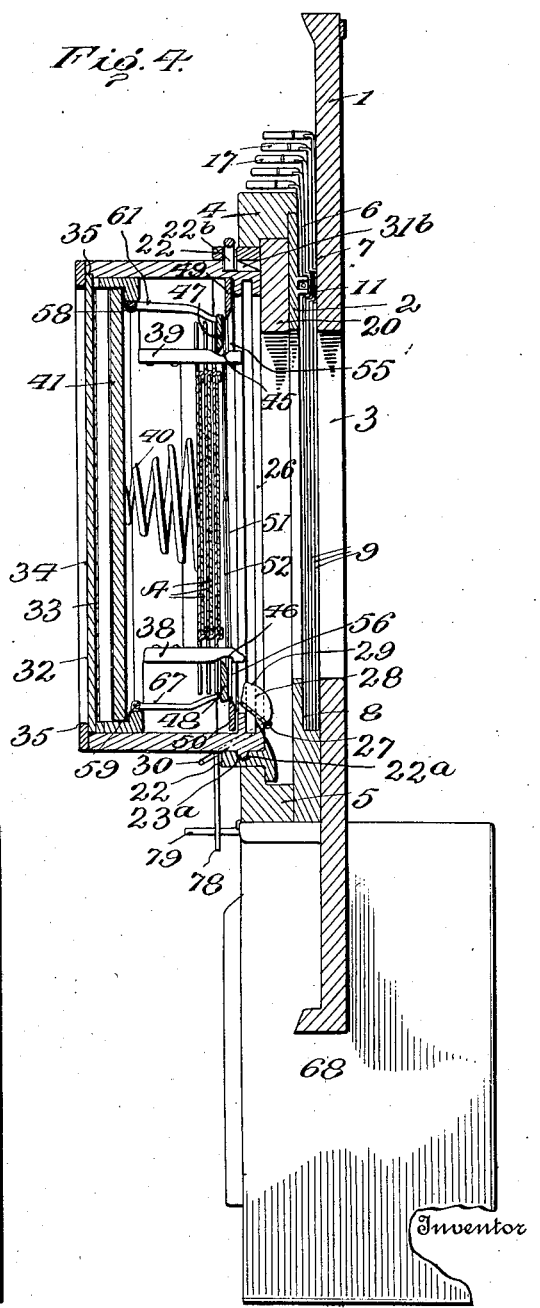

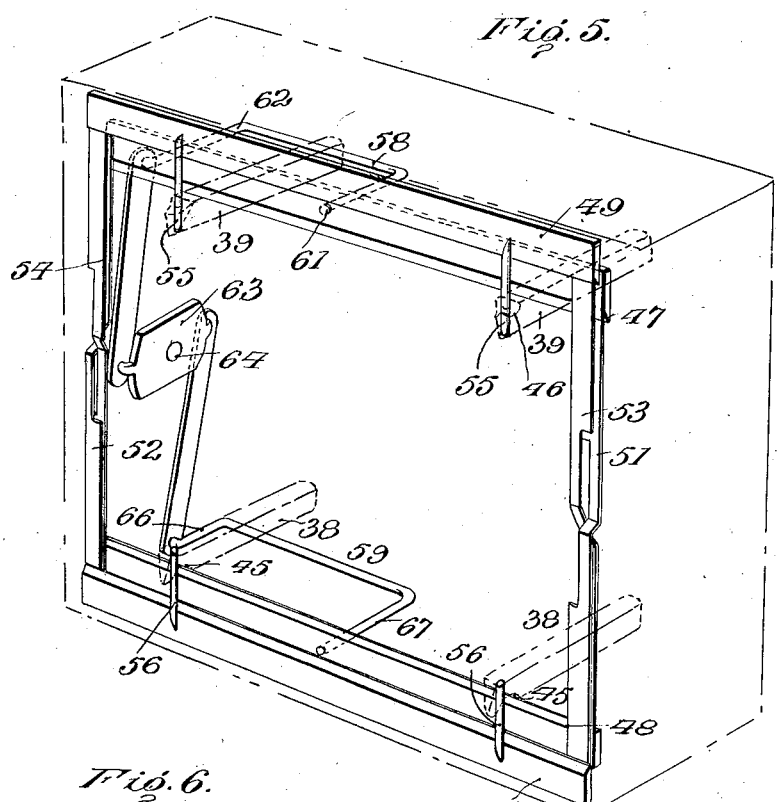
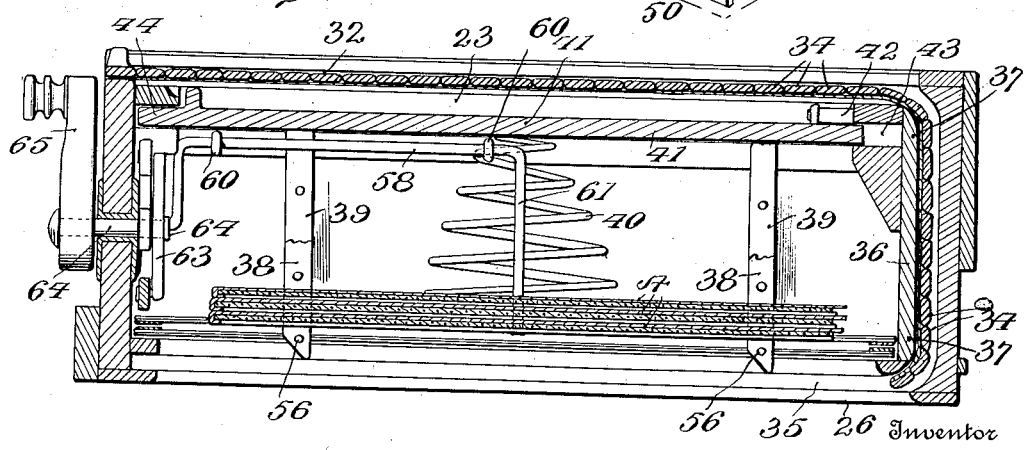

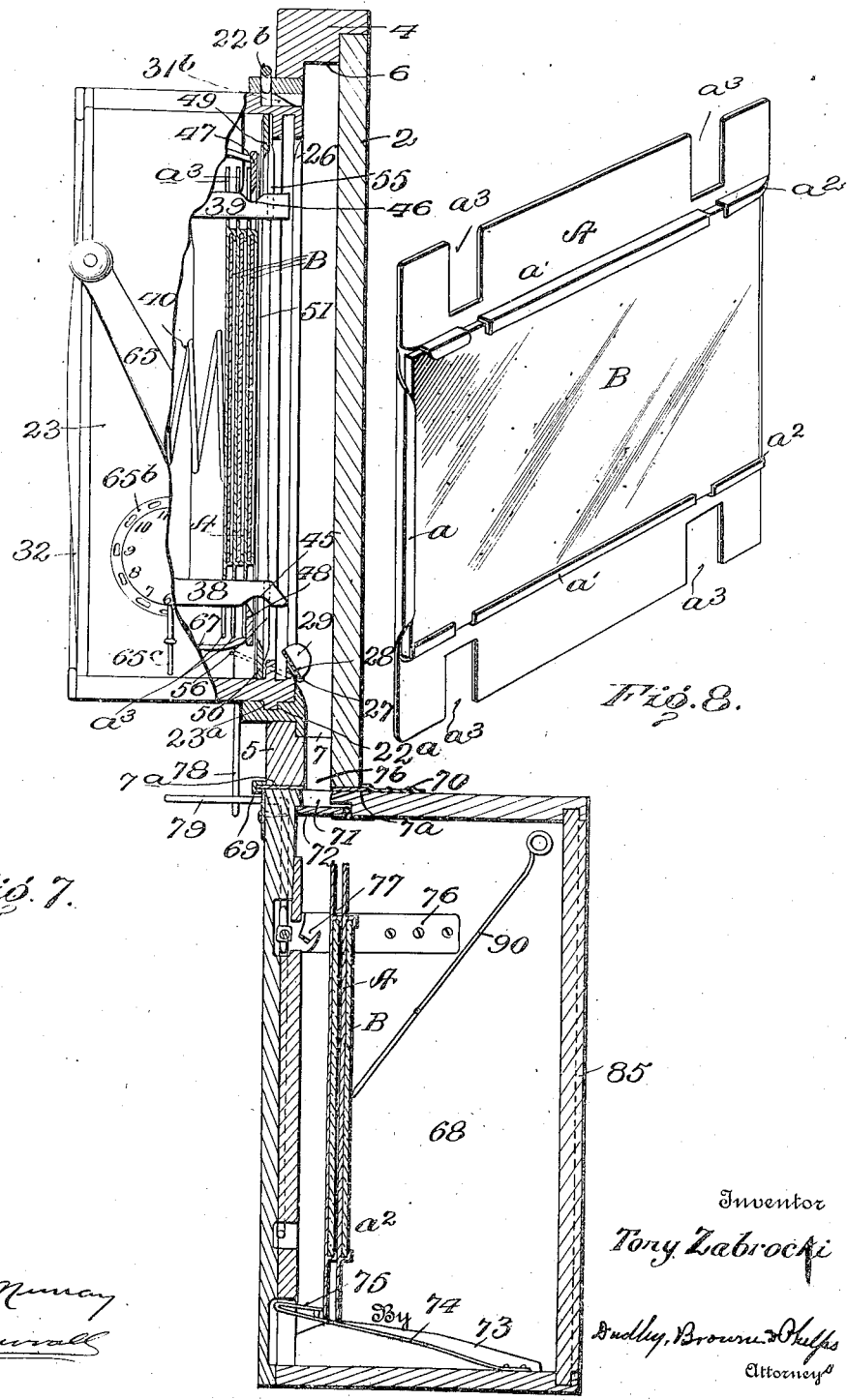

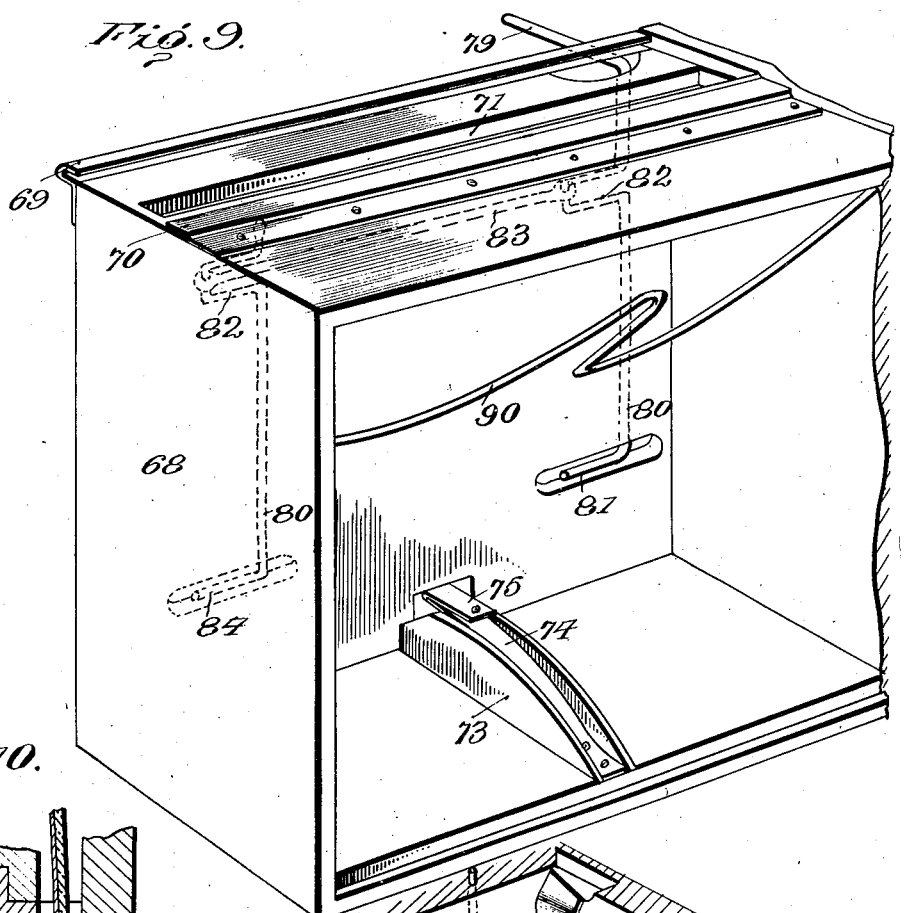

T. ZABROCKI.
MAGAZINE CAMERA.
APPLICATION FILED OCT. 28, 1909.
990,941.
Patented May 2, 1911.
7 SHEETS—SHEET 7.
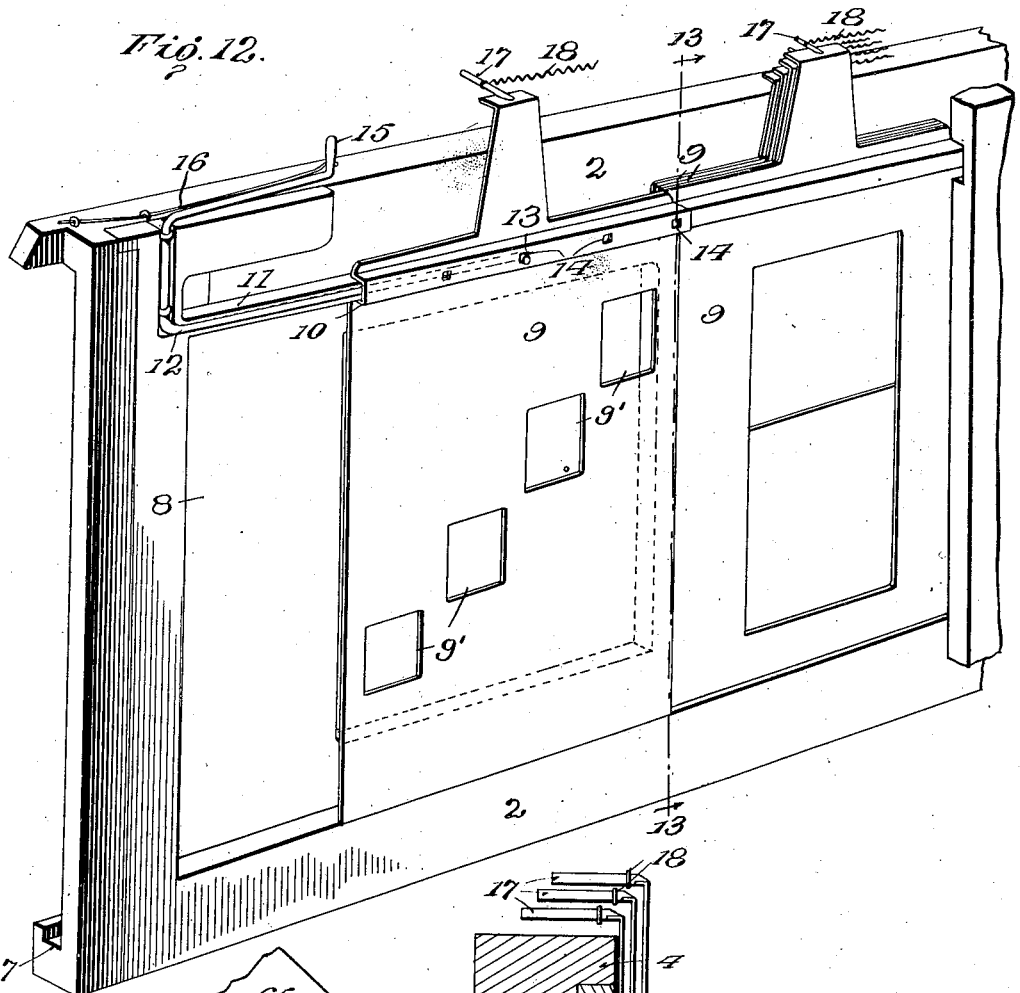
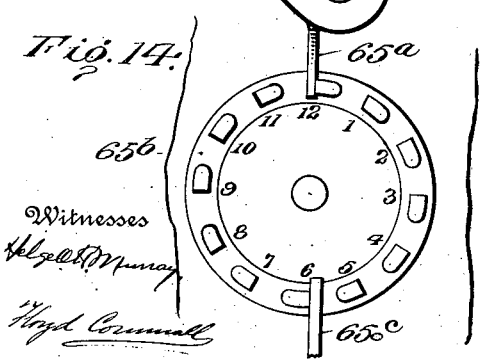
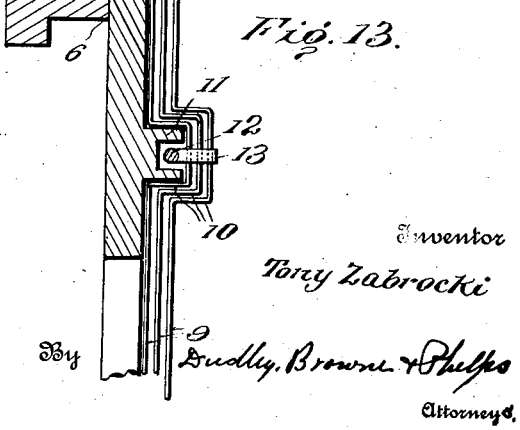
Witnesses
Inventor
Tony Zabrocki
By Dudley, Browne & Phelps
Attorneys

UNITED STATES PATENT OFFICE.

TONY ZABROCKI, OF WINONA, MINNESOTA.

MAGAZINE-CAMERA.

990,941.  Specification of Letters Patent.  Patented May 2, 1911.

Application filed October 28, 1909. Serial No. 525,146.

*To all whom it may concern:*

Be it known that I, TONY ZABROCKI, a citizen of the United States, residing at Winona, in the county of Winona and State of Minnesota, have invented certain new and useful Improvements in Magazine - Cameras, of which the following is a specification.

This invention relates to improvements on photographic cameras of the well known magazine type.

One object of my invention is to provide for automatically depositing exposed plates successively in a removable box or receiver, simultaneously with focusing for another exposure.

Another object of the invention is to provide for the movement of a prepared plate, or the foremost of a number of plates, and the ground glass in the same plane, thus insuring accuracy of focus on said exposed plate.

With these and other objects in view my invention consists in novel features of construction, and combinations which will be first described in detail and then pointed out in the clauses of the claim at the close of this specification.

In the accompanying drawings, wherein is illustrated the best form of apparatus so far devised by me, Figure 1 is a perspective view showing my improved apparatus in position on the frame of a camera, the magazine being shown behind the lens in position to expose a plate. Fig. 2 is a rear elevation of the apparatus, the magazine being shown in position to deliver an exposed plate to the dark box, and the ground glass in rear of the lens of the camera. Fig. 3 is a vertical section on line 3—3 of Fig. 2. Fig. 4 is a vertical section on line 4—4 of Fig. 1. Fig. 5 is a diagrammatic perspective view showing the magazine in dotted lines, and the relation thereto of the parts for moving the plate holders the view being taken from the opposite side from that shown in Fig. 2. Fig. 6 is a horizontal section through the magazine on line 6—6 of Fig. 2, the magazine being reversed from the position in which it is shown in Fig. 2. Fig. 7 is a vertical section on line 7—7 of Fig. 2. Fig. 8 is a view, in perspective, of one of the plate holders. Fig. 9 is a perspective view showing the interior of the dark box. Figs. 10 and 11 are detail sections showing parts of the dark box. Fig. 12 is a view in perspective showing the slide curtains. Fig. 13 is a detail vertical section taken on line 13—13 of Fig. 12. Fig. 14 is a detail elevation showing the exposure indicator or register.

Before proceeding to a description of details of construction, I will outline, in a general way, the principal parts involved, and their functions, my aim being to provide an apparatus to be used with a camera back and comprising a stationary or main frame having horizontal guides or ways in which a slide-frame is adapted to be moved to and fro, said last named frame carrying at one end, (the right hand end as shown) the usual ground or focusing glass, and at the other end being provided with an opening to receive a magazine designed to contain a dozen of the usual prepared plates. The opening receiving the magazine registers with the opening in the camera-back and main frame, in order that the plates in the magazine may be successively fed forward, and exposed when the flexible dark-slide is moved away from in front of the foremost plate. A darkbox adapted to receive the exposed plates, successively, is detachably secured beneath the left hand end of the main frame, the bottom way of which is at this point slotted to register with a similar slot in the darkbox, which latter slot is guarded by a light-excluding flap normally held in its closed position by a spring or springs which yield to the weight of a plate, but act to instantly close the gate when the plate has passed downward into the box. When the slide frame is in the position just described the focusing glass will be in position behind the camera lenses, and upon movement of said frame to bring the magazine again to the camera, a system of trip levers and springs serve automatically to move the exposed plate backward in the dark box in order that another may be received, the foremost plate in the magazine in the meanwhile being automatically moved forward to the plane of the focusing glass, and therefore in correct focus for exposure.

Secured to any suitable camera back 1 is a horizontally disposed main frame 2 provided with an opening 3 Figs. 3 and 4 corresponding with that of the camera back, said frame being extended to the left beyond said back as shown. To the longitudinal edges of said frame rear rails 4 and 5 are secured their facing edges being rabbeted to form parallel ways 6 and 7 for a slide-frame presently to be described. The front face of the main frame 2 is provided with an elongated recess 8 for the reception of slide-curtains 9 formed of metal, or some rigid material which will prevent the passage of light therethrough, as for instance, hard rubber. These slide-curtains 9 are provided respectively with openings 9' of appropriate size to either singly or conjointly expose a prepared plate behind them for the popular "ping-pong" pictures, or those of other usual sizes recognized in the art. The slide-curtains are shaped near the top to form grooves 10 Figs. 12 and 13 which receive and ride upon a chambered rail 11 carried by the main frame, a spring pressed lever 12 being pivoted in said frame and having a dog or detent 13 designated to engage properly positioned perforations 14 in the bottoms of the grooves 10 of the slide curtains. The short leg of the lever 12 is provided with a finger grip 15 by which to move it, and its long leg and dog, in opposition to the pressure of a spring 16, which normally tends to move the lever and detent 13 outward to automatically engage said perforations 14 in the bottoms of the grooves 10, (see Fig. 12).

The upper edges of the slide-curtains 9 are extended and provided, each, with a thumb piece 17, projecting rearward, in the instance shown, and so arranged that they may pass each other horizontally without interference. At the left the upper edges of these slide-curtains decrease in height, stepwise, and are connected at their corners with the free ends of springs 18, the other ends of which are secured at a fixed point on the camera-back 1, said springs serving to hold the curtains away from the opening in the frame normally, in order that the sliding of one curtain, manually, may not impart movement to those next adjacent.

A scale $19^b$ Figs. 1 and 2 is secured upon the upper rail 4, the edge of the rail having notches $19^c$ at the scores of the scale to be engaged by a latch to be presently described.

A slide-frame 20 is mounted to be moved forward and back in the ways 6 and 7 of the main frame, said slide-frame being of such width and thickness as to fit and slide longitudinally in the ways 6 and 7, of the main frame, and of sufficient length to carry upon its rear face a holder for the ground or focusing glass 21, a rectangular socket 22 to receive the forward end of the magazine 23, and between said socket and ground-glass holder, a spring pressed bolt 24 to engage the notches marked by the scale. The material of the body 20 of this slide-frame is removed to form openings, one, 25, opposite the ground glass holder 21, of a size to accord with those in the camera-back 1 and main frame 2, and the other, 26, at that point inclosed by the walls of the socket 22, also agreeing in size with said openings in the camera-back and the main frame.

A plate shift consisting of a rock-shaft 27 journaled at the base and mouth of the socket 22 and carrying a chute 28 provided at its ends with guide wings 29 flared outwardly to the rear, in the position shown in Fig. 4, one end of the shaft, as shown, being bent rearward to form a lever 30 by which the plate shift as a whole may be moved from the position shown in full lines, Fig. 4, to receive a plate holder from the magazine, to that shown in Fig. 7, to guide the plate holder forward toward the main frame, and into the dark-box.

The magazine, designated as a whole by the numeral 23, consists of a rectangular frame, open at front and rear, and adapted to fit snugly at front within the socket 22 of the slide-frame 20, and be locked therein by means of a cleat $23^a$ secured to the bottom wall of a magazine and engaging a recess $22^a$ in the bottom wall of the socket 22, and a spring pressed latch $22^b$ engaging a keeper $31^b$ in the top wall of the magazine. This magazine is provided with a dark-slide 32 to exclude light at front or expose a plate according to adjustment. This dark-slide 32 consists of a sheet of fabric of a nature to prevent the passage of light rays, to which sheet is secured, side by side, a plurality of narrow strips 34 of wood, or other light material, the structure as a whole, being guided at top and bottom to move in ways 35 formed in the top and bottom members of the magazine, a guide-frame 36 being located at one end, having rounded corners 37 (see Fig. 6) to facilitate the sliding movement of the dark-slide 32.

Interiorly the magazine is provided at top and bottom with tracks 38 and 39 on which the plate holders, presently to be described, are moved forward by a spring or springs, a volute spring 40 being shown, carried by the removable back 41 said back being provided at one edge, the left hand edge, as shown, with a plate spring 42 which at the insertion of the back yields to permit said edge to enter a retaining groove 43, and is of sufficient strength to move the back 41 toward the right to engage its right hand edge in a retaining groove 44 at the rear of the magazine.

The plate-holders A Fig. 8 are each formed of a rectangular sheet of metal, or other suitable material, provided on its face adjacent three of its margins with flanges $a$ $a'$ forming keepers to receive the prepared plates B. The ends of the flanges $a'$ are curved inwardly to form stops $a^2$ to engage the outer edge of said prepared plate B and prevent the accidental displacement thereof, there being sufficient space between the plate-holder A and plate B to admit of springing the stops $a^2$ free from the edge of the plate, to remove the same for development. The upper and lower margins of the plate-holder extend somewhat above and below the flanges $a'$ and are provided with deep notches $a^3$ to receive and be guided upon the tracks 38 and 39. These tracks 38 and 39 are preferably of metal to resist wear due to the friction of the plate-holders sliding forward upon them, and their ends are beveled toward the left, see Figs. 5 and 6, to facilitate the discharge of the plate-holders from them, the ends of the lower tracks 38 being also beveled downward, and overhanging the upper edge of the plate shift 28, when the latter is in the position shown in Figs. 4 and 7. Adjacent their forward ends, these tracks 38 and 39 are provided with somewhat deep notches 45 and 46 in their lower and upper surfaces respectively, to receive the edges of the lower and upper stop 47, 48, 49, 50, and release blades 47, 48, and 49—50. The upper stop blade 47 and lower release blade 50 are connected to each other at their ends by rods 51 and 52, and the upper release blade 49 and lower stop blade 48 are similarly connected by rods 53 and 54, to the end that vertical movement in the same direction may be simultaneously imparted to said connected blades. The release blades 49 and 50 are provided with stop-pins 55 and 56, so positioned that they pass through vertical apertures in the tracks 38 and 39 coincident with the notches 45 and 46 therein, said pins being positioned accurately in a plane with the focusing glass 21.

To impart vertical movement to the stop blades and release blades, I provide two U-shaped levers 58 and 59, fulcrumed in suitable bearings as 60, Fig. 6, one forwardly projecting arm 61 of the upper lever 58 being connected to the upper stop blade 47 midway of its length, and the other arm 62 thereof being connected by a link to one end of a yoke 63 mounted on a stub shaft 64 journaled in the side wall of the magazine, and provided at its outer end with an operating crank and handle 65. The other end of the yoke 63 is connected by a link to one arm 66 of lever 59, also having suitable fulcrum bearings like 60 in Fig. 6, the other arm 67 of said lever being connected to the lower stop blade 48. By this arrangement it will be seen that the proper movement of the crank and handle 65 will result in the simultaneous movement downward of the upper release blade 49 and lower stop blade 48, and upward movement of the upper stop-blade 47 and lower release blade 50. This operation permits the spring 40 to thrust the forward plate holder A forward from engagement with the stop blades into engagement with the release blades, or their stop pins 55 and 56, thus moving the prepared plate in said foremost holder into the plane of the focusing glass 21 ready for exposure, and a reverse movement of said handle 65 will result in restoring these parts to their normal positions, the next succeeding plate holder in the magazine being moved forward by spring 40 into contact with the upper and lower stop plates.

An exposure having been made (one or more according to the slide curtain 9 employed) the slide frame will be moved to the left in its ways 6 and 7 until the magazine is above the dark box, designated as a whole by the numeral 68.

Beneath the crank 65, and actuated step by step by a plate spring $65^a$ secured to the hub of said crank is a circular indicator $65^b$ having a circular series of twelve ratchet teeth or projections, numbered "1" to "12", and attached to the side of the magazine is a spring pointer $65^5$ to indicate the number of plates exposed.

The dark-box 68 is rectangular and constructed to exclude light, and provided at top rear corner with metal battens 69 and 70 shaped to snugly engage and slide upon metal plates $7^a$ attached to the under edge of the extension of the main frame 2, and beneath the lower groove or way 7 thereof. The box top is provided with an elongated opening 71 between the battens 69 and 70, said opening being closed by a light excluding spring flap 72. This opening 71 registers with a slot $7^b$ in the rail 5, when the parts are properly assembled.

Interiorly, an arched spring 90 of substantially the form shown is secured, as shown in Fig. 7, at its ends to the side walls of the box at the upper rear corners, the lower or free end thereof being designated to engage an exposed plate and its holder at the end edges as best shown in Fig. 9, in order that, in the subsequent rearward movement of said plate within the box the spring may not sweep across a part of the "subject" to mar it.

An inclined track 73 is secured centrally to the bottom wall of the box, see Figs. 7 and 9, its top being grooved to contain a spring 74, serving to cushion the fall of a plate and holder from the magazine, the spring being provided in rear of its free end with a stop 75 to prevent forward movement of a plate holder thereon.

The side walls of the dark-box are provided with plate-springs 76 near the top, having rearwardly inclined spurs 77 alined with the stop 75 of spring 74, whereby a plate holder having been moved rearward in the box beyond said stop and spurs will be retained sufficiently to rear of the opening 71 where the plate holders are received, to admit another plate holder.

To move the plate holders rearward in the dark box automatically I provide the slide frame with a spring actuated trip 78 Figs. 1, 2 and 7 pivoted to the side of the socket 22 of the slide-frame 20, which in the left hand movement of said slide frame rides over an actuating lever 79 of the dark box but on the return movement operates said lever, which is connected with two rock levers 80 Fig. 9 fulcrumed in the forward part of the box, and having arms 81 of such length that when the lever is moved a plate holder and its plate will be moved rearward past the stop 75 of spring 74 and spurs 77 of springs 76. Conveniently, the rock-levers 80 are shaped as shown for simultaneous operation by the lever 79, which forms an extension of the right-hand rock lever, both levers being bell-cranked as at 82, and the cranks connected by rod 83, and the lower ends 84 of the levers being of a length to accord with the bell-cranks and to coöperate therewith in moving the plate holders rearward.

Thus constructed, the operation of my attachment is as follows: The dark-slide 32 of the magazine 23 will be adjusted to exclude light at front, and the magazine will be loaded with one or more plates of desired size fitted in the plate holders A, through the rear and the back 41, and its spring 40 placed in position as shown in Figs. 4 and 6. The slide frame will now be moved to the left until the spring lever 24 enters its notch near the middle of said rail 4, Fig. 2, thus bringing the focusing glass 21 automatically into proper position behind the opening 3 of the main frame and that of the camera back. Proper focus is now obtained through manipulation of the usual adjusting devices of the camera, and the slide frame will then be moved to the right to bring the magazine 23 back of the opening 3 of main frame. There the slide may be locked in place by causing the latch 24 to engage one or the other of the notches 19ᶜ of scale 19ᵇ of the main frame, according to size of exposure to be made. It is understood of course, that as a preliminary step in the operation, the slide-curtains 9, one or more, must be properly adjusted. The plate-holders A are at this time being pressed forward, the foremost one resting against the upper and lower stop-blades 47 and 48. A downward movement of the crank 65 moves the upper blade upward, and the lower blade downward, at the same time causing an opposite movement of the release blades, this operation resulting in moving the foremost plate-holder forward into contact with the stop pins 55 and 56 of the release blades, at which time the prepared plate is in exact focus, as said stop pins are in a plane with the focusing-glass 21. The dark-slide 32 is now moved from in front of the plate, and an exposure made. Assuming that there is to be but one exposure on this plate the slide frame is moved to the left to the limit of its movement, when upon moving the crank 65 upward a reversal of the described movements of the stop and release blades will be effected and the foremost plate-holder being released will slide down the beveled ends of the tracks 38 onto the chute or plate shift 28, which may now be tilted by operation of lever 30 Figs. 2 and 7 to discharge the plate holder, which will drop through the slot 7ᵇ in the rail 5 onto the spring flap 72, and so into the dark box 68. As the slide frame is thus moved the trip 78 will ride over the lever 79 of the dark box, but on the return movement of the slide-frame the prolonged upper end 78ᵃ of the trip will strike the frame 22 and the trip will actuate the lever 79 exterior of the box and rock levers 80 within the box and thereby move a plate-holder rearward.

The box is provided with a slide cover 85 fitted to exclude light from the exposed plates within the box until said box is removed from the main frame 2 and transferred to a dark room for development.

It will be understood that while the magazine and the dark-box are designed to hold 12 plates and their plate-holders, that a less number may be used, and that the dark-box may be taken to the dark room with but one plate for development.

I claim—

1. The combination with a camera, of an attachment for automatically positioning and discharging exposed plates, comprising a main frame attached to the camera-back, a slide frame movable thereupon and carrying a focusing glass, a plate magazine having stop-pins in a plane with the focusing glass and also carried by said slide, a dark-box removably secured to one end of the main frame, means for transferring an exposed plate to the dark-box, a device for moving said plate aside in the dark-box to give space for another, and means carried by the slide for automatically actuating said device as the magazine is returned to exposing position.

2. The combination with a camera, of an attachment for automatically positioning plates and discharging exposed plates into a dark-box, comprising a main frame attached to the camera-back and provided with rails having ways, the lower rail having a slot near one end through which the plates are discharged, a slide frame movable in said ways and provided with a focusing glass, a socket and a plate shift at the mouth of the socket and adjacent to said slot, a magazine adapted to fit said socket and provided with a dark-slide, and with means to advance plate holders successively to the focusing plane, a dark-box removably attached to the main frame and having a guarded slot beneath the slot in the slide frame, means for delivering a plate to the plate shift whence the plate passes through both said slots into the dark-box, and means for automatically moving said plate rearwardly in the dark-box as the magazine is returned to exposing position.

3. The combination with a camera of an apparatus for automatically positioning plates and discharging exposed plate, comprising a main frame attached to the camera back and having rails provided with ways and the upper one with stop notches and the lower one with a slot, a slide frame mounted in said ways and carrying a focusing glass, a magazine and a catch for engaging said notches to hold the slide in different desired positions, a dark-box removably secured to the main frame and having a guarded slot registering with the slot in the lower way, a plate shift to transfer plates to be discharged from the magazine to the dark-box, and means for operating said plate shift from the exterior of the magazine.

4. The combination with a camera, of an attachment for automatically positioning plates and discharging exposed plates, comprising a main frame secured to the camera back and having attached thereto a plurality of slidable dark curtains for determining the field of exposure and adjustable at will to the opening in the camera back, a spring-actuated detent to lock said curtains in adjusted position, a slide movable lengthwise of the main frame and carrying a focusing glass and magazine, a dark-box removably secured to one end of the main frame, and means for transferring exposed plates from the magazine to the dark-box.

5. The combination with a camera, of an attachment for automatically positioning plates and discharging exposed plates, comprising a main frame secured to the camera back and provided with a plurality of dark curtains adjustable at will to the opening in the camera back and having openings of varying area, a spring-actuated detent to lock said curtains in adjusted position, a slide frame movable lengthwise of the main frame and carrying a focusing glass and a magazine, a dark-box removably secured to one end of the main frame, and means for transferring exposed plates from the magazine to the dark box.

6. The combination with a camera, of an attachment for automatically positioning plates and discharging exposed plates, comprising a main frame secured to the camera back and having a plurality of slidable spring-controlled dark curtains adjustable to the opening in the camera back, a spring actuated detent to lock said curtains in desired position, a slide frame movable lengthwise on the main frame and carrying a focusing glass and a magazine, a dark-box removably secured to one end of the main frame, and means for transferring exposed plates from the magazine to the dark-box.

7. The combination with a camera, of an attachment for automatically positioning plates and discharging exposed plates, comprising a main frame secured to the camera-back, a slide frame movable lengthwise of the main frame and carrying a focusing glass and magazine socket, and a magazine adapted to said socket and embodying a flexible dark slide, a removable back having a spring, tracks for plate holders, stop blades, release blades having stop pins in a plane with the focusing glass, and means to actuate the stop and release blades.

8. The combination with a camera, of an attachment for automatically positioning plates and discharging exposed plates into a dark box, comprising a main frame secured to the camera-back, a slide frame movable lengthwise thereon and carrying a focusing glass and magazine, and a dark box removably secured to one end of the main frame and embodying a slotted top guarded by a spring flap, rock-levers having connected offsets and arms parallel with the offsets, an inclined way having therein a spring carrying a stop, plate springs at the sides of the box having stops, and an arched spring at the back of the box, and means for transferring exposed plates from the magazine to the dark box.

In testimony whereof I affix my signature in presence of two witnesses.

TONY ZABROCKI.

Witnesses:
D. E. TAWNEY,
W. J. SMITH.